United States Patent [19]

Tribout et al.

[11] Patent Number: 4,777,971

[45] Date of Patent: Oct. 18, 1988

[54] HANDLING MACHINE ABLE TO MOVE ALONG A WALL WITH A RANDOM SLOPE

[75] Inventors: Michel Tribout, Breuillet; Bernard Taillez, Verrieres Le Buisson, both of France

[73] Assignees: Service National Electricite de France, Paris; Societe de Travaux en Milieu Ionisant (STMI), Gif sur Yvette, both of France

[21] Appl. No.: 88,471

[22] Filed: Aug. 19, 1987

Related U.S. Application Data

[63] Continuation of Ser. No. 683,348, Dec. 19, 1984, abandoned.

[30] Foreign Application Priority Data

May 9, 1984 [FR] France .................................. 84 07139

[51] Int. Cl.$^4$ .............................................. B08B 3/02
[52] U.S. Cl. .................................. 134/99; 134/167 R; 134/172; 15/1.7; 15/302
[58] Field of Search ................ 180/9.5; 118/207, 108, 118/110, 25

[56] References Cited

U.S. PATENT DOCUMENTS

| | | | |
|---|---|---|---|
| 1,096,894 | 5/1914 | Dodge | 73/46 |
| 2,108,176 | 2/1938 | Newby | 73/46 U X |
| 2,927,456 | 3/1960 | Russell | 73/46 |
| 3,018,657 | 1/1962 | Yevick | 73/46 |
| 3,043,129 | 7/1962 | King | 73/46 X |
| 3,073,727 | 1/1963 | Mullinix et al. | 15/1.7 X |
| 3,337,889 | 8/1967 | West | 15/320 X |
| 3,627,562 | 12/1971 | Hammelman | 114/222 X |
| 3,865,386 | 2/1975 | Wilke | 277/205 |
| 3,913,383 | 10/1975 | Kurosre et al. | 73/46 |
| 4,079,694 | 3/1978 | Galinov | 15/1.7 X |
| 4,132,279 | 1/1979 | Lende et al. | 114/222 X |
| 4,137,988 | 2/1979 | Croix-Marie | 15/302 X |
| 4,192,520 | 3/1980 | Hasegawa | 277/171 X |
| 4,338,697 | 7/1982 | Broadwater | 15/1.7 |
| 4,437,202 | 3/1984 | Nagatsuka | 15/320 |

FOREIGN PATENT DOCUMENTS

| | | | |
|---|---|---|---|
| 0012655 | 6/1980 | European Pat. Off. | |
| 52-73416 | 6/1977 | Japan | 15/1.7 |
| 58-39591 | 3/1981 | Japan | 114/222 |
| 2039213 | 8/1980 | United Kingdom | 15/1.7 |

OTHER PUBLICATIONS

PCT/NO83/00048, 5/1985, Dalseide.

Primary Examiner—Philip R. Coe
Assistant Examiner—Frankie L. Stinson

[57] ABSTRACT

The invention relates to a handling machine designed in such a way that it can move along a surface having a random slope.

The machine has a central chamber and at least one adjacent peripheral chamber with an open side, which can be sealingly applied to the surface by means of gaskets. This application is obtained by producing a vacuum in at least one of the chambers. The displacement of the machine on the surface, e.g. with the aid of caterpillars, is improved by producing an overpressure in at least one other chamber.

3 Claims, 2 Drawing Sheets

HANDLING MACHINE ABLE TO MOVE ALONG A WALL WITH A RANDOM SLOPE

This application is a continuation of application Ser. No. 683,348 filed Dec. 19, 1984 and now abandoned.

BACKGROUND OF THE INVENTION

The present invention relates to a handling machine designed in such a way that it is able to move along the surface of a sloping or horizontal wall in order to carry out random operations thereon.

In the present state of the art, French Pat. No. 1 470 634 and its certificate of addition No. 2 002 527 show that it is known to clean submerged surface with the aid of a handling machine able to move more particularly along the hull of a ship, or within a tank or tanker. This machine has a working chamber with an open side on the side of the submerged surface, and a pump, which continuously discharges to the outside the water contained in said chamber, so as to lower the pressure therein. Thus, said machine is engaged with the submerged surface. Moreover, the handling machine described in the aforementioned specifications is equipped with a drive motor ensuring its displacement along the surface.

In certificate of addition No. 2 002 527, the open side of the chamber is in contact with the submerged surface by an edge having undulations defining a large pressure drop, which further improves the engagement of the machine with the surface under the action of the pump.

Although these known handling machines have a satisfactory behaviour for the specific applications for which they were intended and particularly for cleaning a submerged surface by means of brushes, they cannot be used when it is necessary to successively perform different operations on the surface.

In addition, these machines cannot be used when the operations to be carried out require the presence within the working chamber of a fluid differing from the medium in which the machine is working or moving. Thus, the machine is engaged against the surface by an open circuit circulation within the working chamber of the fluid in which the machine is working and by producing a pressure drop between the edges of the chamber and the surface, so as to produce a vacuum or underpressure within the chamber. Thus, the fluid contained in the chamber must be the same as that of the external medium and there is a permanent communication between the chamber and the external medium at the edge of said chamber. Thus, such machines cannot be used for carrying out different operations requiring the presence of different fluids.

SUMMARY OF THE INVENTION

The present invention relates to a handling machine able to move along a wall having a random slope and which can carry out a random number of successive operations, no matter what the fluid required for performing these operations and which is contrary to the case of the known handling machines.

The present invention therefore proposes a handling machine able to move along a surface having a random slope, said machine having a chamber with an open side able to come into contact with the surface, means for producing a vacuum within the chamber and means for moving the machine along the surface, wherein it comprises at least two chambers, each having an open side able to come into contact with the surface, said means for producing a vacuum within at least one of the said chamber and means for producing an overpressure in at least one other chamber, said overpressure partly balancing the vacuum produced in the first chamber, the open side of each of these chambers being defined by a gasket, which is able to come into tight contact with the surface.

According to a preferred embodiment of the invention, said chambers comprise a central chamber and at least one peripheral chamber surrounding the central chamber.

Preferably, the open side of each of the adjacent chambers in which there is a different pressure has a common part defined by a gasket having two lips. In the same way, the open side of each of the adjacent chambers in which the same pressure is present has a common part defined by a gasket with at least one lip.

According to another feature of the invention, a different fluid circulates in each of the chambers. These fluids can in particular be air and water in the case of a machine required to brush a surface face, or an electrolyte, water and air in the case of a machine having to electrolytically polish a metal surface, e.g. for the radioactive decontamination thereof.

One of the main objectives is to provide a machine which makes it possible, by sucking in air, gas or all liquids, possible leaks occurring outside the medium in which the machine is located.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
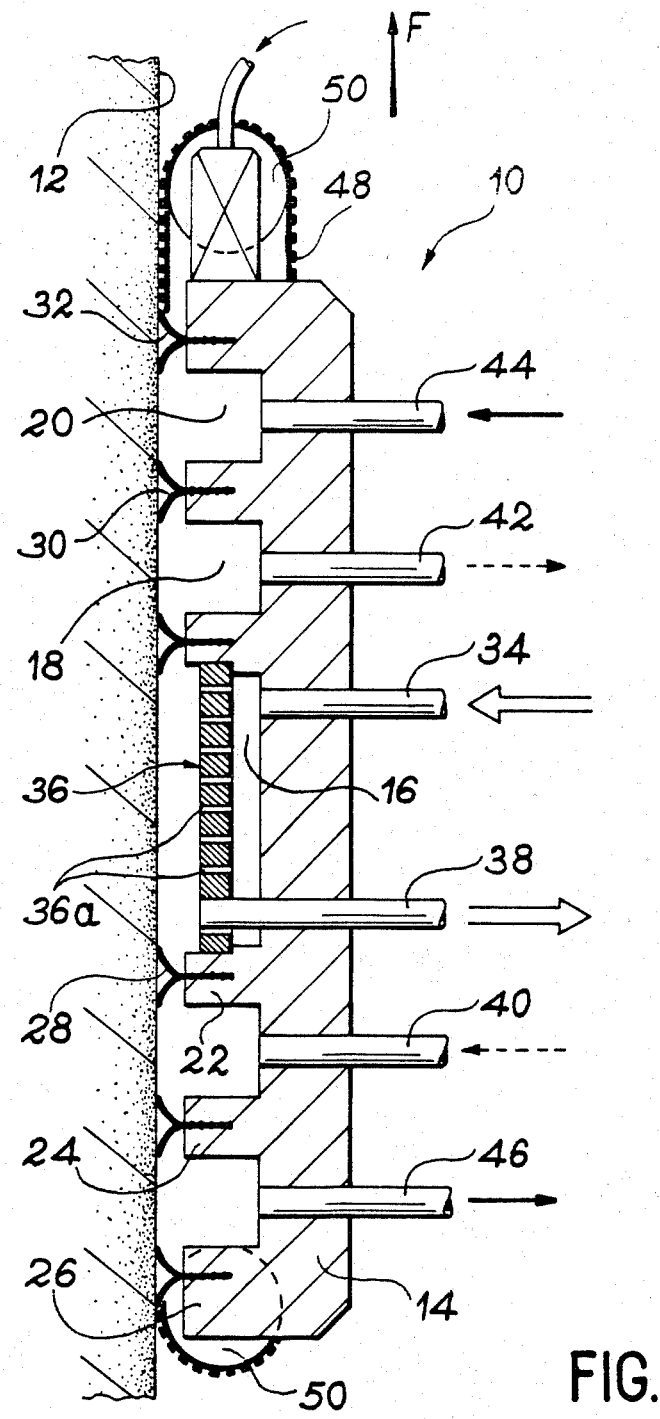
FIG. 1 a longitudinal sectional view of a handling machine for the electrolytic polishing of a metal surface for the radioactive decontamination thereof.
Figure 2:
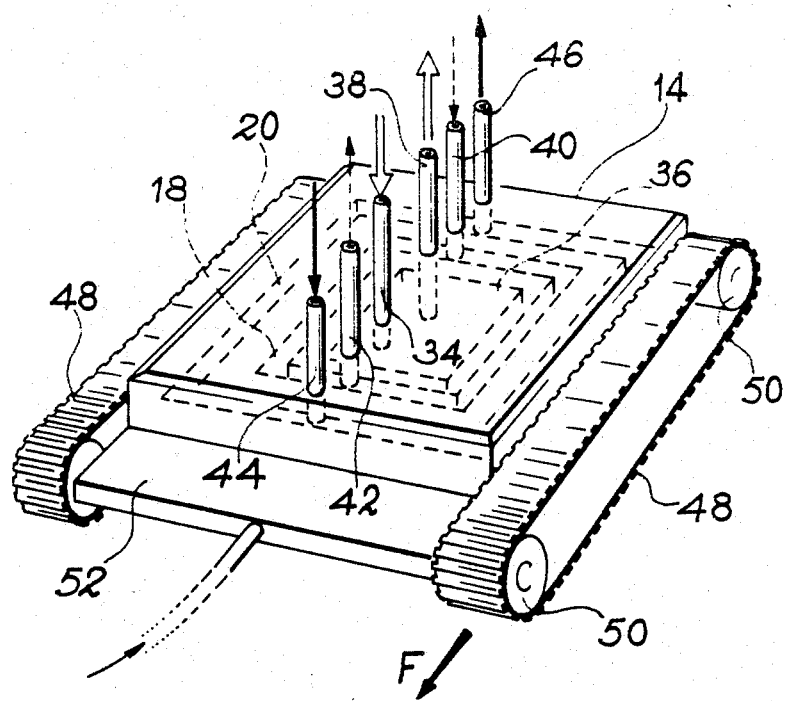
FIG. 2 a perspective view of the handling machine shown in FIG. 1.

FIGS. 1 and 2 show a handling machine 10 for the electrolytic polishing of a surface 12 with a random slope and which is in particular vertical (FIG. 1), in order to radioactively decontaminate said surface.

As is diagrammatically illustrated in FIG. 1, the machine 10 comprises a box or case 14 within which are formed a central electrolysis chamber 16, a washing or rinsing chamber 18 surrounding chamber 16 and a drying chamber 20 surrounding chamber 18. Thus, with respect to the central chamber 16, chambers 18 and 20 constitute peripheral chambers.

Chambers 16, 18 and 20 are open on the same side of box 14, said side being engaged with the surface 12, in the manner illustrated in FIG. 1. In the most widely encountered case, shown in the drawings, where surface 12 is a planar surface, the side of box 14 on to which open chambers 16, 18 and 20 is also planar. However, it could have any other shape matched to that of the surface, such as a partly cylindrical shape.

The central chamber 16 is separated from the washing chamber 18 by a first partition 22 substantially perpendicular to surface 12 and giving a rectangular configuration to the central chamber 16. In the same way, the washing chamber 18 is separated from the drying chamber 20 by a second partition 24 which is also perpendicular to surface 12 and giving the outer envelope of chamber 18 a rectangular configuration with sides parallel to those of chamber 16. Finally, box 14 has a third partition 26, which is also perpendicular to surface 12 and gives the outer envelope of chamber 20 a rectangular configuration parallel to that of the outer envelope of chamber 18.

In the represented embodiment where the surface 12 is planar, the ends of partitions 22, 24 and 26 defining the open side of each of the chambers are all located in the same plane, which can be engaged with surface 12.

According to an important feature of the invention, the end of each of these partitions 22, 24 and 26 has a gasket 28, 30 and 32 respectively. When machine 10 is applied against surface 12 by means to be described in greater detail hereinafter, joints 28, 30, 32 ensure a perfect insulation between each of the chambers 16, 18, 20. Thus, a different fluid can be circulated in each of these chambers, independently of the medium in which the machine is moving, which can consequently be of a random nature.

In the embodiment shown in FIGS. 1 and 2, the central chamber 16 is used for the electrolysis of surface 12 by electrolyte suction or spraying.

To this end, the electrolyte is introduced into chamber 16 by a pipe 34 issuing to the rear of an electrode 36 with respect to surface 12. Electrode 36 is a hollow electrode having a large number of openings such as 36a, through which the electrolyte introduced by pipe 34 is sprayed on to that part of surface 12 positioned facing chamber 16. A pipe 38 issuing to the front of electrode 36 makes it possible to discharge the electrolyte towards a storage tank or towards a not shown recycling and regeneration installation.

According to an important feature of the invention, the fluid circulating in working chamber 16, i.e. the electrolyte in the case of the application shown in FIGS. 1 and 2, is used for engaging the handling machine 10 with surface 12. To this end, a vacuum is produced within chamber 16 by sucking the electrolyte through pipe 38.

As has been stated hereinbefore, the first peripheral chamber 18 constitutes a washing or rinsing chamber for surface 12, after the latter has been subject to the action of the electrolyte. To this end, a washing or rinsing liquid such as water is injected into chamber 18 by pipe 40, said liquid then being discharged out of chamber 18 by a pipe 42.

Finally, as has also been mentioned hereinbefore, the second peripheral chamber 20 is used for drying surface 12 after the latter has been washed or rinsed. For this purpose, a gas such as air is injected into chamber 20 by a pipe 44 and is then discharged by a pipe 46.

According to another important feature of the invention, part of the force used in engaging the handling machine 10 with surface 12 is compensated by producing an overpressure compared with the external pressure within at least one of the chambers 18 and 20.

In the embodiment shown in FIGS. 1 and 2, this result is obtained by injecting the washing liquid under pressure through pipe 40. Conversely, a vacuum is produced in chamber 20 by circulating air therein by suction through pipe 46. According to the invention, the combined effect obtained as a result of the vacuums produced in chambers 16 and 20 and the overpressure produced in chamber 18 makes it possible to obtain an adequate engagement force of machine 10 on surface 12 to ensure that the machine is maintained on said surface no matter what its slope, whilst giving said engagement force an adequately low value to ensure that a displacement of the machine along the surface is possible without it being necessary to exert an excessive force on the machine. In other words, the maximum separation force corresponding to the weight of the machine increased by the overpressure prevailing in chamber 18 is permanently maintained slightly below the engagement force resulting from the vacuums produced in chambers 16 and 20.

In the embodiment shown in FIGS. 1 and 2, the means for moving the machine along surface 12 e.g. comprise two lateral caterpillars or belts 48, fitted on either side of box 14 on wheels 50.

The arrangement of wheels 50 is such that the surface of the drive belts or caterpillars 48 coming into contact with surface 12 substantially coincides with the plane formed by gaskets 28, 30, 31, 32. Belts 48 can be driven by any known means acting on wheels 50. These means can in particular be electric motors or a turbine system mounted on a casing 52 (FIG. 2).

Bearing in mind the displacement direction of machine 10 obtained by caterpillars 48, indicated by arrow F in FIG. 1, it can be seen that the electrolyte suction pipe 38, the pressurized water supply pipe 40 and the air supply pipe 46 are preferably located to the rear of the machine, whereas pipes 34, 42 and 44 are preferably located to the front of the machine.

In the embodiments shown in FIGS. 1 and 2, where the pressure prevailing in adjacent chambers 16, 18, 20 differs, each of the gaskets 28, 30, 32 is a double action gasket. Each gasket then preferably has two lips able to tightly contact surface 12 under the action of the engagement force.

In the not shown hypothesis where two adjacent chambers are at the same pressure, a single action gasket only having a single sealing lip could possibly be used.

Moreover, the static gaskets or joints shown in FIG. 1 can be replaced by dynamic gaskets or joints, such as inflatable gaskets or joints without passing beyond the scope of the invention, sealing then being obtained by the inflation thereof.

Figure 3:
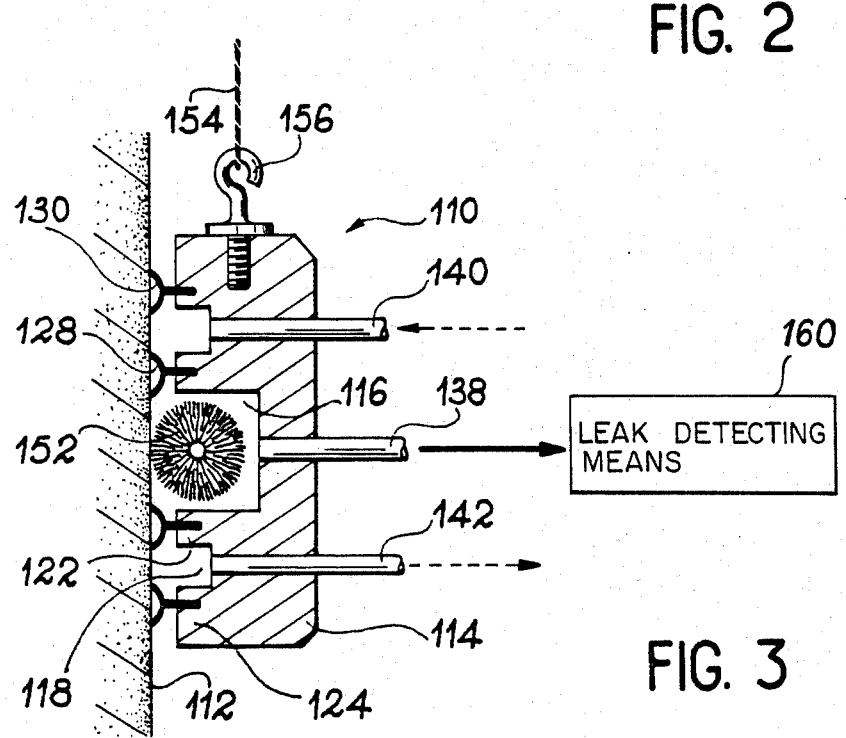
FIG. 3 a longitudinal sectional view comparable to FIG. 1 showing a handling machine usable for cleaning a surface.

FIG. 3 shows another embodiment of the invention applied to the cleaning of a surface by brushing.

The machine 110 shown in FIG. 3 comprises a box 114 defining a central brushing chamber 116 and a single peripheral washing chamber 118. The chambers 116 and 118 are open on the same planar side of box 114, in contact with the surface 112 to be cleaned by means of the two-lip gaskets 128, 130, respectively carried by the partition 122 separting chambers 116 and 118 and by partition 124 separating chamber 118 from the outside.

In the central chamber 116 is provided at least one rotary brush 152 in contact with that part of surface 112 facing chamber 116. The brush rotation is controlled by any known means, such as a not shown electric motor. The air present in chamber 116 is sucked in by a pipe 138, which has the effect of both discharging the dust separated from surface 112 by the brush and of engaging the machine 110 with surface 112. A water supply pipe 140 and a water discharge pipe 142 issuing into the peripheral chamber 118 make it possible to ensure the washing of surface 112.

According to the invention, the vacuum caused by the suction of air out of chamber 116 is in part compensated by the pressurized supply of water to chamber 118 by pipe 140. This facilitates the displacement of machine 110.

In the embodiment shown in FIG. 3, the upward displacement on vertical surface 112 is controlled with the aid of a cable 154, whereof one end is fixed to the machine box 114 by a hook 156 and whose not shown, opposite end is connected to a traction means such as a winch.

In a variant also shown in FIG. 3, the machine is used for detecting leaks in the wall defining the surface 112. In such a case, known leak detecting means 160 are connected to the pipe 138, and the brush 152 is inoperative.

Obviously, the invention is not limited to the embodiments described in exemplified manner hereinbefore, but in fact covers all variants thereof. Thus, the two embodiments described clearly show that the displacement of the machine can be controlled by any known means without passing beyond the scope of the invention. In the same way, the number of machine chambers is arbitrary as a function of the number of operations to be carried out on the surface to be treated and provided that there are at least two. Moreover, the applications of the machine according to the invention can vary widely and can relate both to the electropolishing described with reference to FIGS. 1 and 2 and the brushing described with reference to FIG. 3, together with cleaning (paint, sheet metal, concrete, etc.), the deposition of paints or gels, electrolytic deposition, decontamination by any process, cleaning by ultrasonics and spraying miscellaneous products, as well as the deposition of products ensuring a shielding of the surface with respect to different emission sources.

In the same way, the medium in which the machine according to the invention travels can be of a random nature and can be air, gas or a random liquid. The invention has numerous applications, such as in the nuclear, maritime, mechanical, electrochemical, building and other industries.

What is claimed is:

1. A handling machine able to move along and stay in contact with a surface having any random slope with respect to horizontal, said machine comprising: a case having partitions demarcating a central chamber and at least one peripheral chamber surrounding said central chamber, each of said chambers being adjacent to a least one other chamber and separated from the latter by one of said partitions, each partition having an end carrying a gasket in tight direct physical contact with the surface when the machine is in operation, so as to prevent any fluid communication between said chambers, said machine further comprising a suction pipe connecting at least one of said central and peripheral chambers to vacuum producing means, a supply pipe and a discharge pipe connecting at least one other of said central and peripheral chambers to overpressure producing means, overpressure produced by said overpressure producing means partly balancing the vacuum produced in said at least one of said central and peripheral chambers, so as to maintain the machine on the surface with a given force, and means for moving the machine along the surface.

2. A machine according to claim 1, wherein a different fluid circulates in each of said chambers.

3. A machine according to claim 1, wherein each gasket has two lips.

* * * * *